(12) United States Patent
Watson et al.

(10) Patent No.: US 11,674,537 B2
(45) Date of Patent: Jun. 13, 2023

(54) CLIP FOR MOUNTING A SOLAR MODULE TO A RAIL SYSTEM

(71) Applicant: NEXTracker Inc., Fremont, CA (US)

(72) Inventors: Tyler Watson, San Francisco, CA (US); Ricardo Delgado-Nanez, San Jose, CA (US)

(73) Assignee: NEXTRACKER LLC, Fremont, CA (US)

( * ) Notice: Subject to any disclaimer, the term of this patent is extended or adjusted under 35 U.S.C. 154(b) by 251 days.

(21) Appl. No.: 16/903,431

(22) Filed: Jun. 17, 2020

(65) Prior Publication Data
US 2021/0396255 A1  Dec. 23, 2021

(51) Int. Cl.
*F16B 5/06* (2006.01)
*H02S 20/20* (2014.01)
*F16B 2/22* (2006.01)

(52) U.S. Cl.
CPC .............. *F16B 5/0635* (2013.01); *F16B 2/22* (2013.01); *H02S 20/20* (2014.12)

(58) Field of Classification Search
CPC .......... F16B 5/0635; F16B 2/22; F16B 7/044; F16B 5/123; H02S 20/20; H02S 20/00; F24S 25/634; F24S 25/636; F24S 2025/6004
See application file for complete search history.

(56) References Cited

U.S. PATENT DOCUMENTS

| | | | |
|---|---|---|---|
| 6,106,310 A * | 8/2000 | Davis | H01R 4/48 439/95 |
| 6,495,997 B2 | 12/2002 | Hall | |
| 6,672,018 B2 | 1/2004 | Shingleton | |
| D625,588 S | 10/2010 | Norris et al. | |
| D625,589 S | 10/2010 | Norris et al. | |
| 7,972,177 B2 | 7/2011 | Richter | |
| 8,025,508 B2 * | 9/2011 | Parker | H01R 4/36 439/92 |
| 8,839,573 B2 | 9/2014 | Cusson et al. | |

(Continued)

FOREIGN PATENT DOCUMENTS

CN  102263149 A  11/2011

OTHER PUBLICATIONS

PCT Search Report and Written Opinion issued in PCT application No. PCT/US2021/037088 dated Sep. 1, 2021.

*Primary Examiner* — Robert Sandy
*Assistant Examiner* — Rowland Do
(74) *Attorney, Agent, or Firm* — Weber Rosselli & Cannon LLP

(57) ABSTRACT

The present disclosure relates to a solar power system including at least one mounting assembly including a rail, at least one framed solar module, and at least one clip to secure the solar module to the rail. The clip includes at least a pair of sidewalls extending from a top plate or rear wall, each sidewall including a slot, a recess, and a locking member, at least one of the slot, recess, or both include a serrated edge. The clips may secure a solar module to the rail by coupling to the frame of the solar module to a rail of the mounting assembly within the slots of the sidewalls. The clips may be secured to the mounting assembly by locking members positioned on a distal end thereof. The clips may establish an electrical grounding connection between the frame of the solar module and the rail.

19 Claims, 11 Drawing Sheets

(56) References Cited

U.S. PATENT DOCUMENTS

| | | | |
|---|---|---|---|
| 8,894,424 B2 | | 11/2014 | DuPont |
| D738,713 S | * | 9/2015 | Volin .............................. D8/394 |
| 9,130,088 B2 | | 9/2015 | Croft et al. |
| 9,316,416 B2 | | 4/2016 | Poulakis |
| 9,490,743 B2 | | 11/2016 | Reynolds et al. |
| 10,107,320 B2 | | 10/2018 | Compton |
| D837,143 S | | 1/2019 | Sade |
| 10,187,004 B2 | | 1/2019 | Rothschild |
| D872,009 S | | 1/2020 | Hood |
| D876,942 S | * | 3/2020 | Kuhl ........................ F16B 7/22 D8/394 |
| 10,852,038 B2 | | 12/2020 | Rothschild |
| 10,868,490 B1 | * | 12/2020 | Watson .................... F16B 2/22 |
| 2008/0244881 A1 | | 10/2008 | Zante |
| 2010/0018009 A1 | | 1/2010 | Finot |
| 2011/0078892 A1 | * | 4/2011 | Hartelius .............. F24S 25/636 72/379.2 |
| 2014/0220834 A1 | | 8/2014 | Rizzo |
| 2015/0092383 A1 | | 4/2015 | Corio et al. |
| 2018/0054154 A1 | | 2/2018 | Stapleton |

\* cited by examiner

CLIP FOR MOUNTING A SOLAR MODULE TO A RAIL SYSTEM

BACKGROUND

1. Technical Field

The present disclosure relates to clips suitable for mounting at least one solar module to a rail system. More particularly, the present disclosure relates to clips including at least a first structural wall connected to a pair of sidewalls extending from opposite ends of the first structural wall, the pair of sidewalls forming a channel therebetween, and each sidewall having a slot including at least one serrated edge and a locking member positioned on a distal end portion of the sidewall.

2. Discussion of Related Art

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

Solar modules can employ solar panels made of silicon or other materials (e.g., III-V cells such as GaAs) to convert sunlight into electricity. Solar panels typically include a plurality of photovoltaic (PV) cells interconnected with wiring to one or more appropriate electrical components (e.g., switches, inverters, junction boxes, etc.).

Most solar power systems place an array of solar modules at a location where sunlight is readily present. This is especially true for residential, commercial, or industrial applications in which multiple solar modules are desirable for generating substantial amounts of energy.

In some arrangements, solar modules are placed side-by-side in an array. Each solar module can be mounted to a rail system including at least a ground-based support structure, such as a solar tracker pole, or a roof-based support structure, such a roof rail or mount, by driving a fastener through both a coupling member, e.g., clip, and the solar module into some portion of the rail system. The assembly process can be physically challenging and inefficiently time-consuming because the space wherein the fastener, coupling member and solar modules are joined is typically very small or narrow and thus tough to access. Plus, the array assembler typically has to drive the fastener through the coupling member into the modules while also ensuring that adjacent modules maintain a proper position relative to each other and relative to the support structure. In addition, the combination of fasteners and coupling members can be costly to manufacture and difficult to store and/or ship. Thus, there remains a continuing need for improved coupling members and more efficient methods for mounting solar modules to support structures.

SUMMARY

The present disclosure describes clips suitable for mounting at least one solar module to a rail system. In some embodiments, the clips are configured to lock at least one solar module into a fixed position relative to a rail system. In some embodiments, the clips are configured to lock a plurality of solar modules into a fixed position relative to a rail system and relative to the other solar modules. In some embodiments, the clips are designed to be used without the assistance of a fastener or fastening device.

The clips of the present disclosure include at least a pair of sidewalls extending from opposite end portions of at least one structural wall selected from a top plate, a rear wall, or both. The sidewalls each include an upper portion defining an upper length, a lower portion defining a lower length greater than the upper length, a slot and recess positioned between a part of the upper and lower portions, the slot or recess including at least one serrated edge, and a locking member positioned on a distal end portion of the lower portion of the sidewalls.

In some embodiments, the clips described herein include both a top plate and a rear wall, as well as at least first and second sidewalls. The top plate includes a top proximal end portion, a top distal end portion, and opposite first and second top side end portions extending therebetween. The first sidewall extends downwardly from the first top side end portion of the top plate, the first sidewall includes a first upper portion defining a first upper length, a first lower portion defining a first lower length greater than the first upper length, and a first locking member positioned on a first lower distal end portion of the first lower portion. The first upper portion and the first lower portion are separated in part by a first slot and a first recess proximal to the first slot. The first recess connects a first upper edge of the first slot to a first lower edge of the first slot. At least one of the first upper edge, the first lower edge, or the recess is serrated. The second sidewall extends downwardly from the second top side end portion of the top plate, the second sidewall includes a second upper portion defining a second upper length, a second lower portion defining a second lower length greater than the first upper length, and a second locking member positioned on a second lower distal end portion of the second lower portion. The second upper portion and the second lower portion are separated in part by a second slot and a second recess proximal to the second slot. The second recess connects a second upper edge of the second slot to a second lower edge of the second slot. At least one of the second upper edge, the second lower edge, or the recess is serrated. The rear wall is connected to at least one of the top proximal end portion of the top plate, a first sidewall proximal end portion, or a second sidewall proximal end portion.

In some embodiments, the pair of sidewalls extend from opposite ends of only a top plate. In some embodiments, the pair of sidewalls extend from opposite ends of only a rear wall.

In some embodiments, the clips described herein may include a rear wall and at least a first and second sidewall. The rear wall includes a first rear wall end portion and a second rear wall end portion opposite the first rear wall end portion. The first sidewall extends outwardly or longitudinally from the first rear wall end portion of the rear wall. The first sidewall includes a first upper portion defining a first upper length, a first lower portion defining a first lower length greater than the first upper length, and a first locking member positioned on a first lower distal end portion of the first lower portion. The first upper portion and the first lower portion are separated in part by a first recess proximal to a first slot, the first recess connects a first upper edge of the first slot to a first lower edge of the first slot. At least one of the first upper edge, the first lower edge or the recess is serrated. The second sidewall extends outwardly or longitudinally from the second rear wall end portion of the rear wall, the second sidewall includes a second upper portion defining a second upper length, a second lower portion defining a second lower length greater than the first upper length, and a second locking member positioned on a second lower distal end portion of the second lower portion. The second upper portion and the second lower portion separated in part by a second recess proximal to a second slot, the second recess connects a second upper edge of the second slot to a second lower edge of the second slot. At least one of the second upper edge, the second lower edge, or the recess is serrated.

In some embodiments, the clips described herein may include a top plate and at least a first and second sidewall. The top plate includes a top proximal end portion, a top distal end portion, and opposite first and second top side end portions extending therebetween. The first sidewall extends downwardly from the first top side end portion of the top plate, the first sidewall includes a first upper portion defining a first upper length, a first lower portion defining a first lower length greater than the first upper length, and a first locking member positioned on a first lower distal end portion of the first lower portion. The first upper portion and the first lower portion are separated in part by a first recess proximal to a first slot, the first recess connects a first upper edge of the first slot to a first lower edge of the first slot. At least one of the first upper edge, the first lower edge, or the first recess is serrated. The second sidewall extends downwardly from the second top side end portion of the top plate, the second sidewall includes a second upper portion defining a second upper length, a second lower portion defining a second lower length greater than the first upper length, and a second locking member positioned on a second lower distal end portion of the second lower portion. The second upper portion and the second lower portion are separated in part by a second recess proximal to a second slot, the second recess connects a second upper edge of the second slot to a second lower edge of the second slot. At least one of the second upper edge, the second lower edge or the second recess is serrated.

The clips described herein include at least one serrated edge that is configured to bite into at least one of the framed solar module, the support rail or mounting structure of the solar power system, or both, to lock the framed solar module to the support rail and also ground the clip to the framed solar module. By bite, the serrated edge cuts into the outer surface of the frame, the rail, or both, to both secure and grip the clip to the frame, rail, or both.

The clips described herein are further described to be part of a solar power system or a kit for assembling a solar power system, such as a solar tracker system.

Methods of forming solar power systems, such as a solar tracking system, which utilize the clips described herein are also provided.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

The present disclosure describes clips suitable for mounting at least one solar module to a mounting structure or rail system of a solar power system. The solar power system may be any type of solar power system, such as a roof-top solar power system, or a solar tracker system, and the like. In particular embodiments, the solar power system is a solar tracker system including at least one torque tube extending generally perpendicular to one or more solar tracker poles, the at least one torque tube including one or more mounting structures secured thereto, the mounting structures configured to mount a plurality of framed solar modules thereon, the solar modules being secured to the torque tube via the mounting structure. The framed solar modules locked into position with the mounting structure or rail system via the clips described herein.

Figure 1A:
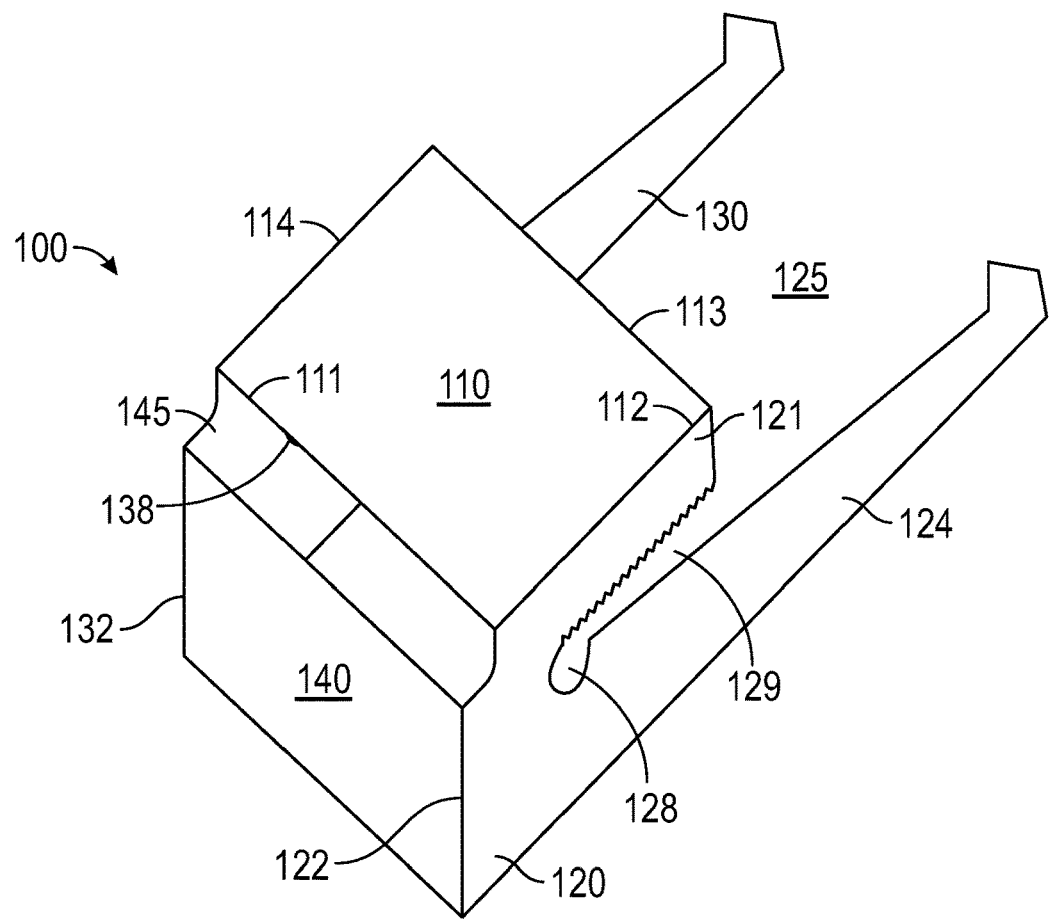
FIG. 1A is a perspective view of a clip as described in at least one embodiment herein.
Figure 1B:
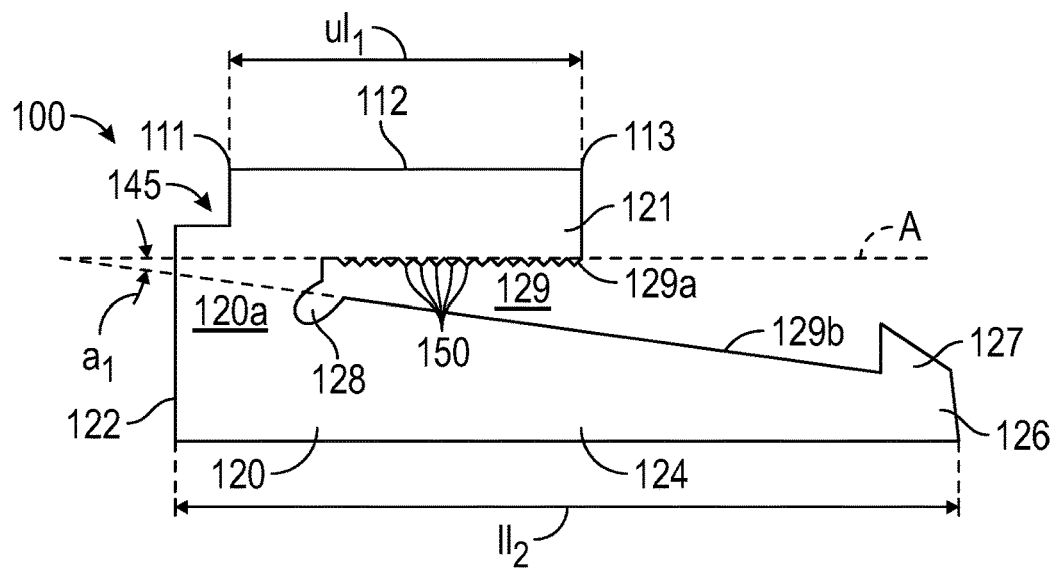
FIGS. 1B and 1C are opposing side views of the clip of FIG. 1A and as described in at least one embodiment herein.
Figure 1C:
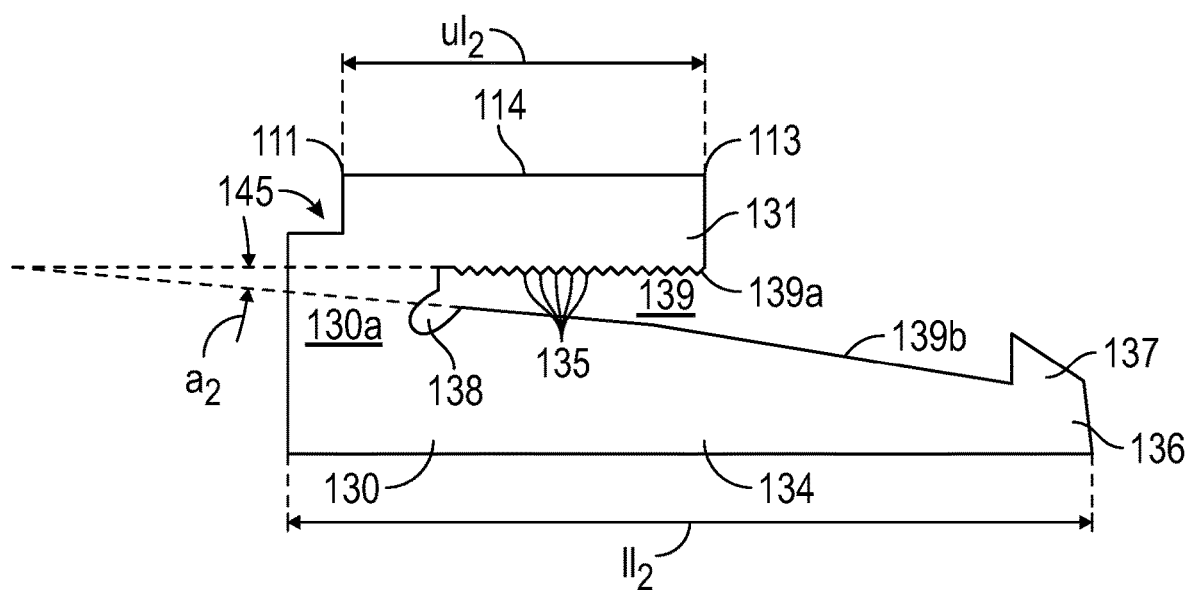

Turning now to FIGS. 1A-1C, the clips 100 described herein may include a top plate 110, a first sidewall 120, a second sidewall 130, and a rear wall 140. Top plate 110, as shown and in some embodiments, may be generally planar and extend along a longitudinal axis (A) of the clip from a top proximal end portion 111 to a top distal end portion 113 and in a direction transverse to the longitudinal direction from a first side end portion 112 to a second side end portion 114. The first and second side end portions 112, 114 being opposite each other and extending between the top proximal and distal end portions 111, 113.

Clip 100 includes at least a pair of sidewalls 120, 130 extending downward from top plate 110, and particularly from first and second side end portions 112, 114 of top plate 110. The pair of sidewalls 120, 130 are spaced apart relative to each other creating a channel 125 therebetween. As further depicted in FIG. 1A, the pair of side walls 120, 130 may extend downwardly from top plate 110 in a generally perpendicular direction relative to the longitudinal axis (A)

of the clip 100 and/or top plate 110. The pair of sidewalls 120, 130 also extending generally parallel to each other.

The first sidewall 120 includes a first upper portion 121 defining a first upper length ($ul_1$) and a first lower portion 124 defining a first lower length ($ll_1$) greater than the first upper length ($ul_1$). The first upper portion 121 and the first lower portion 124 are separated in part by a first slot 129 and a first recess 128 which is proximal to the first slot 129. The first upper portion 121 and the first lower portion 124 are also connected to each other in a first common area 120a of the first sidewall 120 which is proximal to the first recess 128 and the first slot 129.

The first recess 128 connects a first upper edge 129a of the first slot 129 to a first lower edge 129b of the first slot 129. At least one of the first upper edge 129a and first lower edge 129b is serrated, and as particularly depicted in FIGS. 1A-1B, in some embodiments, only the first upper edge 129a is serrated to include a plurality of gripping elements or teeth 150. The teeth or serrated edge are configured to ground the clip 100 to a solar module by removing any protective layer of anodization (or paint or coating) and biting into the frame of the solar module thereby locking the solar module and frame into a fixed position relative to a rail or mounting structure of the solar power system.

The first sidewall 120 also includes a first locking member 127 positioned on a first lower distal end portion 126 of the first lower portion 124. The first locking member 127 is configured to secure the clip to a rail or mounting structure of a solar power system.

As further illustrated in FIGS. 1A-1B, the first upper edge 129a of the first slot 129 is generally planar and generally coplanar with the top plate 110 and the first lower edge 129b of the first slot 129 extends distally from the first recess 128 at a first acute angle ($\alpha_1$) relative to the first upper edge 129a. The first lower edge 129b of the first slot extending between the first recess 128 and first locking member 127.

As further illustrated in FIGS. 1A-1B, the first lower length ($ll_1$) of first lower portion 124 is greater than the first upper length ($ul_1$) of first upper portion 121 of the first sidewall 120. In some embodiments, the first lower length ($ll_1$) can be from about 1.01 to about 5 times greater than the first upper length ($ul_1$). In some embodiments, the first lower length ($ul_1$) can be from about 1.05 to about 2.5 times greater than the first upper length ($ul_1$). In some embodiments, the first lower length ($ll_1$) can be from about 1.1 to about 2 times greater than the first upper length ($ul_1$).

Turning to FIG. 1C, the second sidewall 130 of clip 100 includes a second upper portion 131 defining a second upper length ($ul_2$), a second lower portion 134 defining a second lower length ($ll_2$) greater than the second upper length ($ul_2$), and a second locking member 137 positioned on a second lower distal end portion 136 of the second lower portion 134. The second upper portion 131 and the second lower portion 134 separated in part by a second slot 139 and a second recess 138 proximal to the second slot 139, the second recess 138 connecting a second upper edge 139a of the second slot 139 to a second lower edge 139b of the second slot 139. At least one of the second upper edge 139a and second lower edge 139b is serrated, and as particularly depicted in FIG. 1C, in some embodiments, only the second upper edge 139a is serrated to include a plurality of gripping elements or teeth 135. The second upper portion 131 and the second lower portion 134 are connected to each other in a second common area 130a of the second sidewall 130 proximal the second recess 138 and the second slot 139.

As further illustrated in FIG. 1C, the second upper edge 139a of the second slot 139 is generally planar itself and generally coplanar with the top plate 110 and the second lower edge 139b of the second slot 139 extends distally from the second recess 138 at a second acute angle ($\alpha_2$) relative to the second upper edge 139a. The second lower edge 139b of the second slot extending between the second recess 138 and second locking member 137.

In some embodiments, the first and second acute angles ($\alpha_1$, $\alpha_2$) are generally the same. In some embodiments, the first and second acute angles ($\alpha_1$, $\alpha_2$) may be different, and more particularly, may differ by about 5 degrees, 10 degrees, or 15 degrees.

As further illustrated in FIGS. 1A and 1C, the second lower length ($ll_2$) of second lower portion 134 is greater than the second upper length ($ul_2$) of second upper portion 131 of the second sidewall 130. In some embodiments, the second lower length ($ll_2$) can be from about 1.01 to about 5 times greater than the second upper length ($ul_2$). In some embodiments, the second lower length ($ll_2$) can be from about 1.05 to about 2.5 times greater than the second upper length ($ul_2$). In some embodiments, the second lower length ($ll_2$) can be from about 1.1 to about 2 times greater than the second upper length ($ul_2$).

In some embodiments, the first upper length ($ul_1$) of first upper portion 121 and second upper length ($ul_2$) of second upper portion 121 are generally the same. In some embodiments, the first lower length ($ll_1$) of first lower portion 124 and second lower length ($ll_2$) of second lower portion 134 are generally the same.

The clip 100 may further include rear wall 140, as shown in FIG. 1A, which is connected to both the first sidewall 120 and the second side wall 130, and particularly to a first sidewall proximal end portion 122 and a second sidewall proximal end portion 132. The rear wall 140 has a generally flat surface configured to be hit by an installation tool, such as a hammer or mallet, to drive the slot 129 onto the frame of the solar module and the rail or mounting structure to secure the clip thereon. In some embodiments, and particularly as shown in FIG. 1A, the rear wall 140 is not connected to the top proximal end portion 111 of the top plate 110 and is spaced from the top proximal end portion 111 by rear aperture 145. As illustrated, rear aperture 145 extends completely across rear wall 140 or top plate 110. However, in some embodiments, rear aperture 145 may only extend along a portion of rear wall 140 or top plate 110.

In some embodiments, the first and second sidewalls are generally parallel to each other. In some embodiments, the first and second sidewalls are generally perpendicular to the top plate. In some embodiments, the first and second sidewalls are generally perpendicular to the rear wall. In some embodiments, the first and second sidewalls are generally perpendicular to both the top plate and the rear wall. In some embodiments, the rear wall and the top plate are perpendicular to each other and the first and second side walls are perpendicular to both the rear wall and the top plate.

Although, in some embodiments, the first and second sidewalls 120, 130 of the clip 100 are generally the same, as depicted in FIGS. 1A-1C, in some other embodiments, the features of first and second sidewalls may differ. For example, various differences are depicted in FIGS. 2A-2G wherein the general overall configuration of the side walls remains the same while certain combinations of features of the sidewall differ. In some embodiments, the first and second sidewalls are identical, and in some embodiments, the first and second sidewalls are different.

Figure 2A:
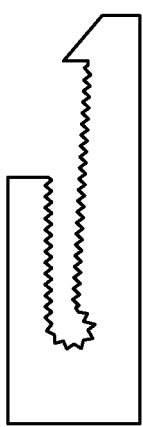
FIGS. 2A-2F are side views of various clip configurations as described in at least one embodiment herein.
Figure 2B:
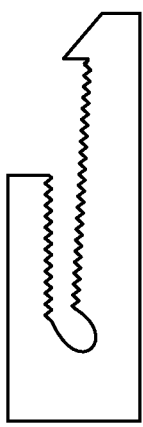
Figure 2C:
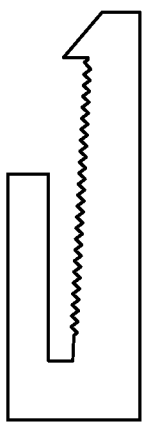
Figure 2D:
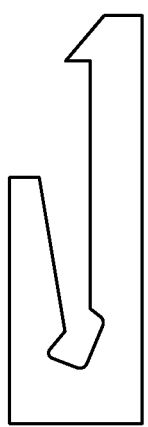
Figure 2E:
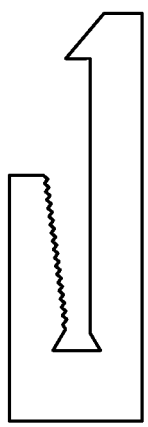
Figure 2F:
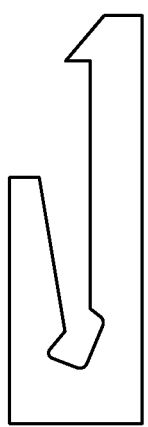
Figure 2I:
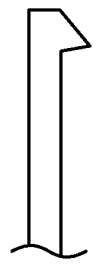
FIGS. 2G-2I are side views of various locking member configurations as described in at least one embodiment herein.
Figure 2H:
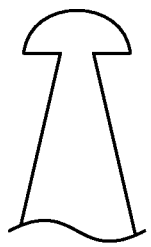
Figure 2G:
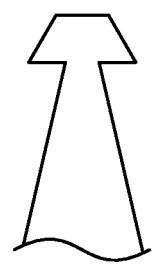

As depicted in FIGS. 2A-2I, the sidewalls described herein may include any combination of features, such as serrated edges, recess shapes, and/or locking member configurations. For example, in some embodiments, only the lower edge of a slot is serrated (FIG. 2A), while in some embodiments, both the upper and lower edges of a slot are serrated (FIG. 2B). In some other examples, in some embodiments, the recess is serrated, alone or in combination with either upper or lower edge of the slot. (FIGS. 2C-2D). In still other embodiments, the recess may be a particular shape, such as generally triangular or rectangular as shown, but not intended to be limited thereto. (FIGS. 2E-2F). It is envisioned that the outer edges of the frames of the solar modules may include a locking structure which mirrors the shape of the recess, i.e., the locking structure is generally circular, triangular or rectangular, thereby allowing the recess to receive and matingly engage the locking structure of the frame. For example, the outer edge of the frame of the solar module may include a triangular locking structure that is configured to fit within and matingly engage the triangular recess depicted in FIG. 2E. In yet other embodiments, the locking member positioned on the distal end of the lower portion of the sidewalls described herein may not only be configured to extend from the lower portion towards the upper portion of the sidewall, but may also or alternatively, extend from the lower portion and away from the upper portion of the sidewall. (FIGS. 2G-2I). In addition, the locking member may be a particular shape, such as generally triangular, circular, or trapezoidal as shown, but not intended to be limited thereto.

The clips provided herein are configured as one-piece structures or monolithic structures. The clips can be made from any suitable process, including but not limited to, injection molding, compression molding, extrusion molding, thermoforming, sintering, lamination, die-casting, powder metallurgy, forging, stamping, and the like.

Turning now to FIGS. 3-7 which illustrate clips 300, 400, 500, 600, 700 according to other embodiments. Each clip 300, 400, 500, 600, 700 is similar in some respects to clip 100, 200; therefore, like components have been given like reference numbers increased in 100 increments, and the differences between the various clips will be discussed in more detail while also including some similarities as a point of reference. In addition, components or features described with respect to only one or some of the embodiments described herein, and specifically to any of the clips 100, 200, 300, 400, 500, 600, 700 described herein, are equally applicable to each of the clips 100, 200, 300, 400, 500, 600, 700 and any other embodiments described herein.

Figure 3:
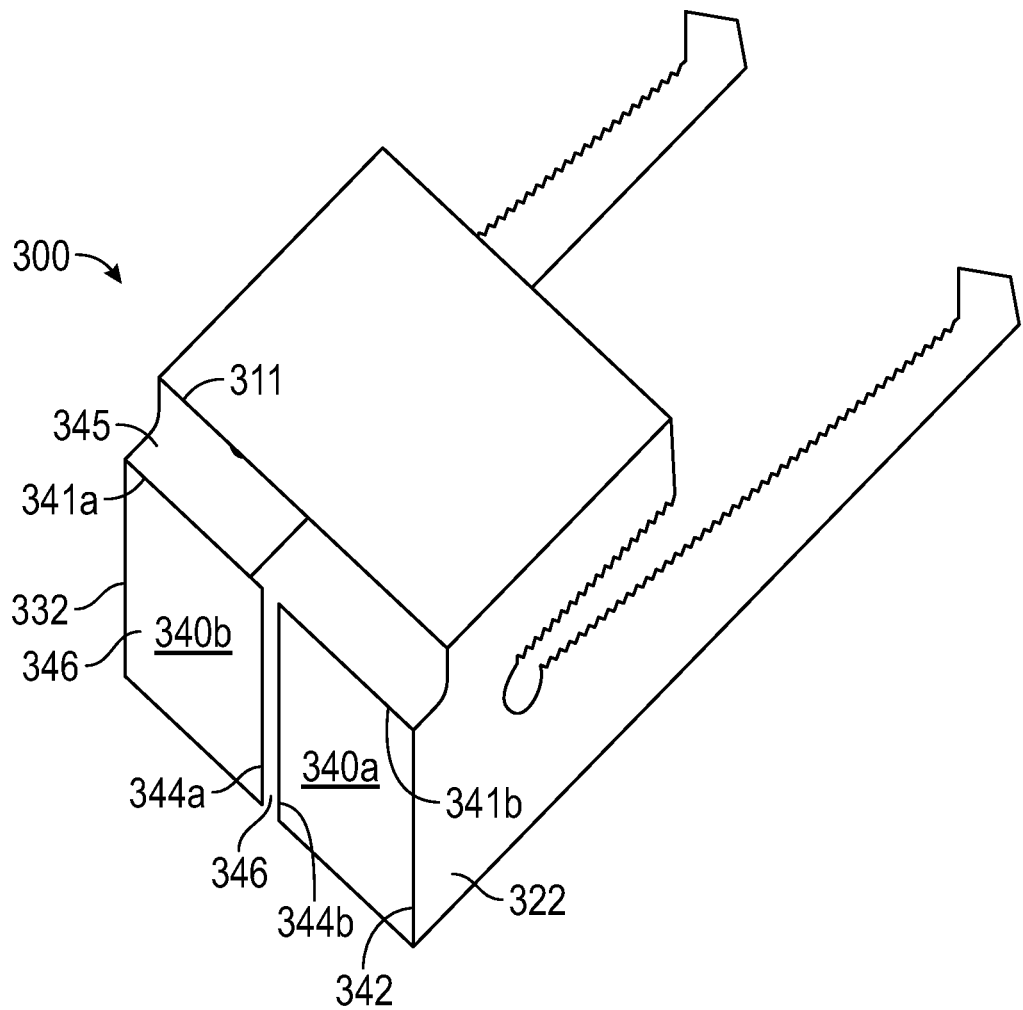
FIG. 3 is a perspective view of a clip as described in at least one embodiment herein.

The illustrated clip 300 of FIG. 3 includes a rear wall 340 having a first rear wall 340a and a second rear wall 340b, the first rear wall 340a having a first rear wall end portion 342 connected to a first sidewall proximal end portion 322, the second rear wall 340b having a second rear wall second end portion 346 connected to a second sidewall proximal end portion 332 and a rear slit 346 separating the first rear wall edge portion 344a from the second rear wall edge portion 344b. As illustrated, rear slit 346 connects to rear aperture 345. In some embodiments, rear slit 346 may not connect to rear aperture 345 while still separating a portion of first rear wall 340a from second rear wall 340b. Rear aperture 345 is also depicted as being positioned between the top proximal end portion 311 of the top plate 310 and the first and second rear wall top edges 341a and 341b, respectively.

Although edge portions 344a, 344b, and rear slit 346, as well as top edges 341a, 341b, and rear aperture 345, are shown as generally straight edges, it is envisioned that the edge portions, slits, and apertures described herein may form any geometric configuration, including but not limited to rounded, octagonal, triangular, sinusoidal, diagonal, and sawtooth configurations and the like.

The rear slit 346, alone or in combination with the rear aperture 345, may provide the clip 300 with the flexibility and/or adaptability to change, i.e., widen or shrink, the width of the channel 325 between the first and second sidewalls 320, 330 as needed depending upon the specific configuration of the framed solar modules and solar tracker mounting structures. The rear slit 346, alone or in combination with the rear aperture 345, may also prevent the rear wall 340 from applying a stress load equally across the entire clip thereby providing clip 300 with the ability to independently maintain the stress load bearing on the first sidewall portion 320 of the clip 300 to only the first rear wall 340a and not the second rear wall 340b, and similarly for a stress load bearing on the second sidewall 330 with regard to second rear wall 340b and not first rear wall 340a.

Figure 4A:
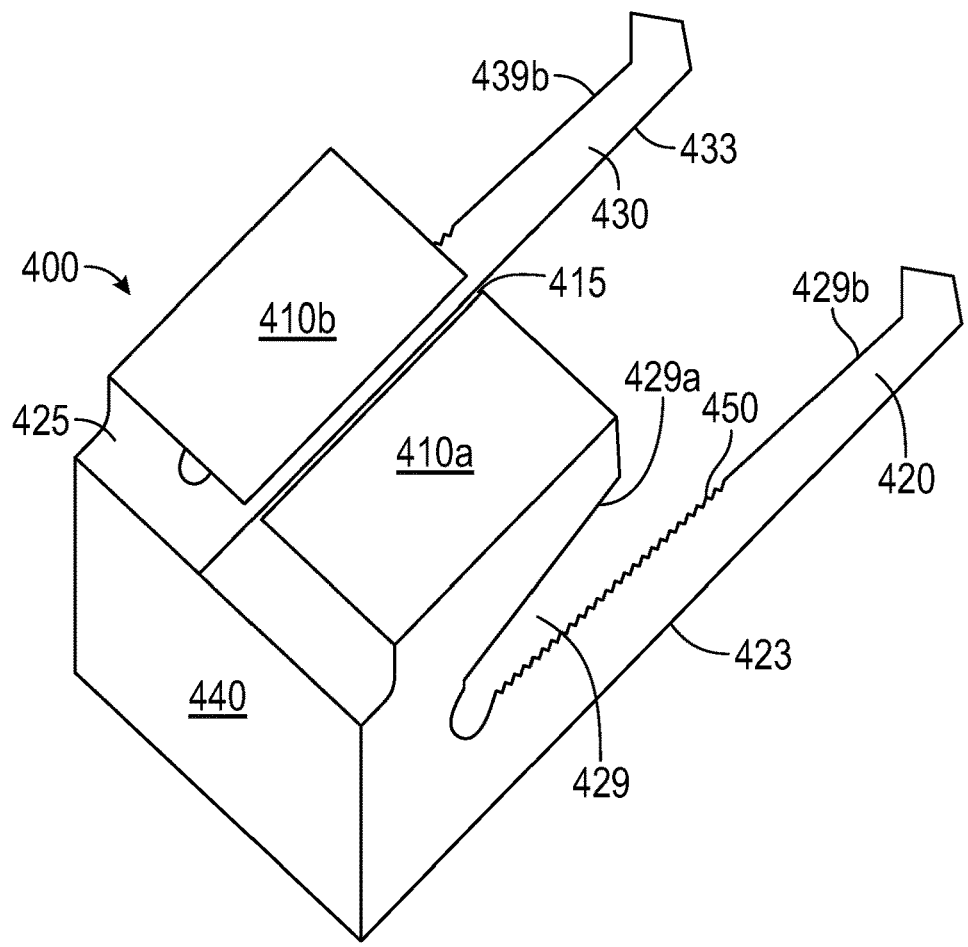
FIG. 4A is a perspective view of a clip as described in at least one embodiment herein.
Figure 4B:
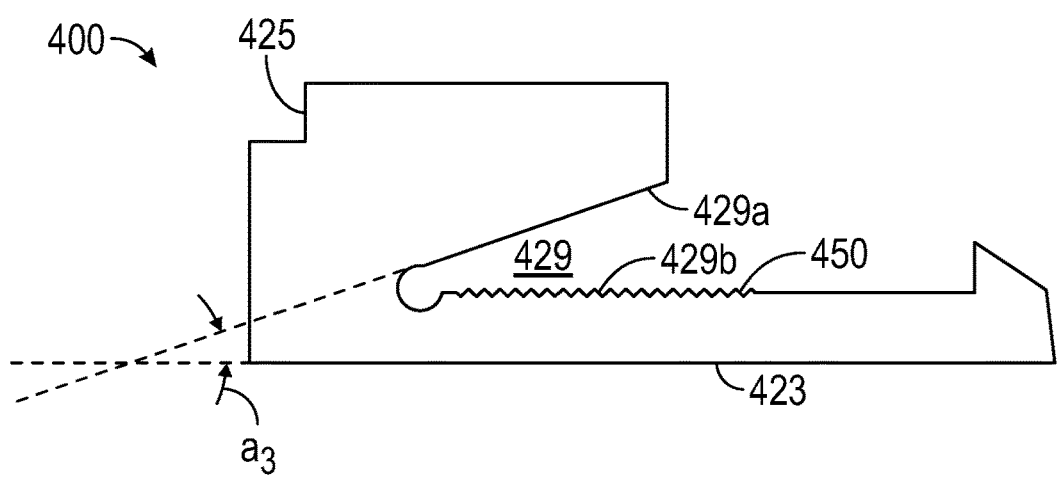
FIGS. 4B and 4C are opposing side views of the clip of FIG. 4A and as described in at least one embodiment herein.
Figure 4C:
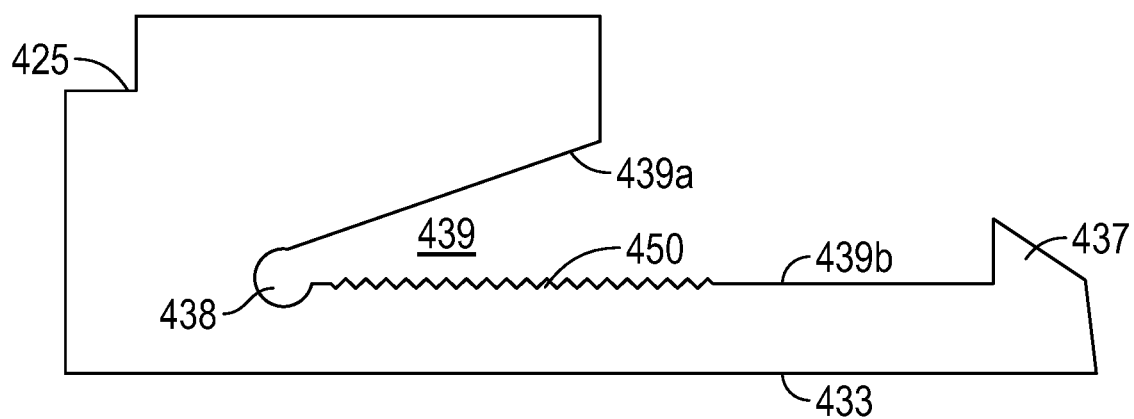

In FIGS. 4A-4C, clip 400 includes a single solid rear wall 440 and a top plate 410 which is split into multiple parts, e.g., the first and second top plates 410a, 410b, by at least one top slit 415. In addition, the first and second lower edges 429b, 439b of the first and second slots 429, 439 are each generally planar and generally coplanar with the bottom edge portion 423, 433 of the first and second sidewalls 420, 430. Also, the first and second upper edges 429a, 439a of first and second slots 429, 439 of the pair of sidewalls 420, 430, respectively, extend distally from the first and second recesses 428, 438, respectively at acute angles ($\alpha_3$) relative to the bottom edge portions 423, 433 and/or first and second lower edge portions 429b, 439b.

Although the first and second top plates 410a, 410b, top slit 415, and rear aperture 445, are shown as generally straight edges, it is envisioned that the plates, slit(s), and aperture(s) described herein may form any geometric configuration, including but not limited to rounded, octagonal, triangular, sinusoidal, diagonal, and sawtooth configurations and the like.

The top slit 415, alone or in combination with the rear aperture 445, may provide the clip 400 with the flexibility and/or adaptability to change, i.e., widen or shrink, the width of the channel 425 between the first and second sidewalls 420, 430 as needed depending upon the specific configuration of the framed solar modules and solar tracker mounting structures. The top slit 415, alone or in combination with the rear aperture 445, may also prevent the rear wall 440 from applying a stress load equally across the entire clip thereby providing clip 400 with ability to independently maintain the stress load bearing on the first sidewall portion 420 of the clip 400 to only the first top plate 410a and not the second top plate 410b, and similarly for a stress load bearing on the second sidewall 430 with regard to second top plate 410b and not first top plate 410a.

Figure 5:
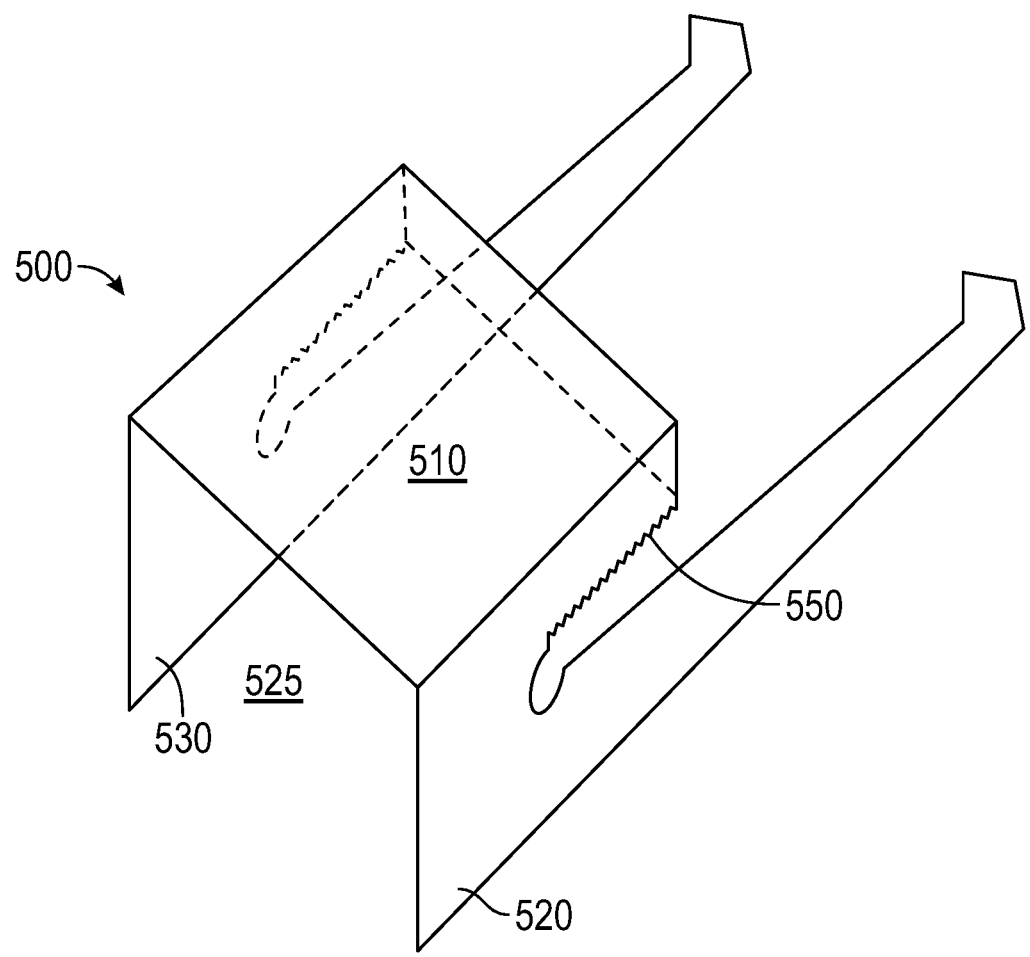
FIG. 5 is a perspective view of a clip as described in at least one embodiment herein.
Figure 6:
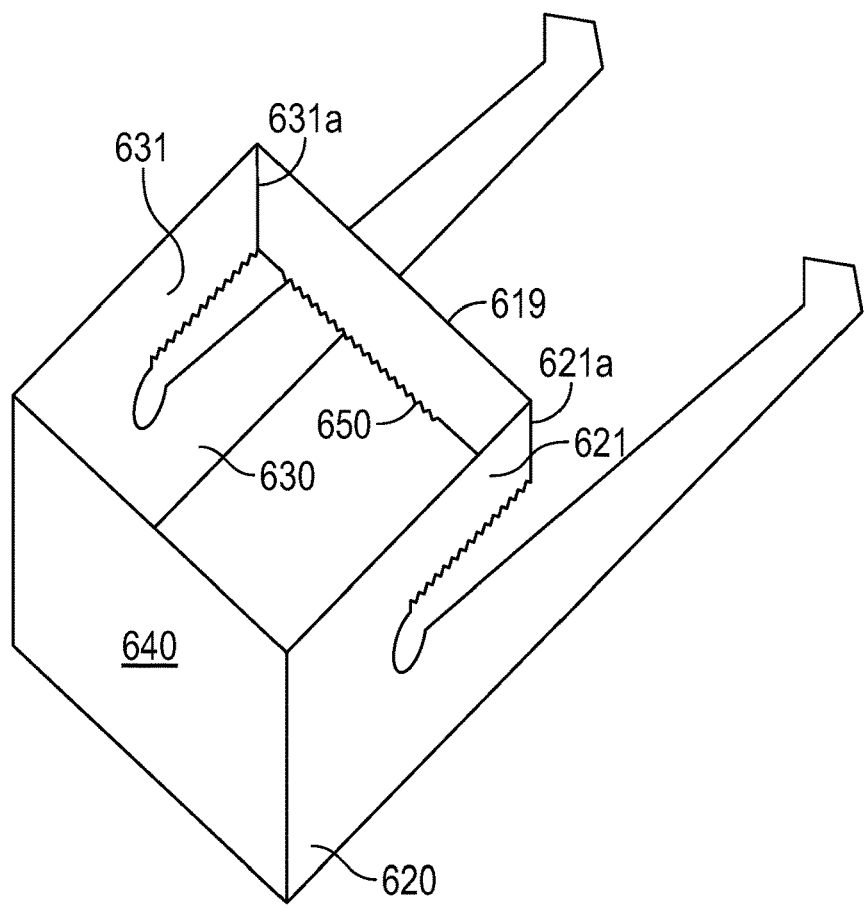
FIG. 6 is a perspective view of a clip as described in at least one embodiment herein.

Turning to FIGS. 5 and 6, clips 500, 600 include at least a pair of sidewalls 520, 520, 620, 630, as described herein, connected to each other by at least one, if not only one, of a top plate 510 or a rear wall 640. In some embodiments, as specifically shown in FIG. 5, clip 500 may be free of a rear wall allowing channel 525 to pass completely through clip 500 and between first and second sidewalls 520, 530. In some embodiments, as also specifically shown in FIG. 5, first and second sidewalls 520, 530 of clip 500 may only be connected to each other by top plate 510.

In some embodiments, as specifically shown in FIG. 6, clip 600 may be free of a top plate and may include an optional front face wall 619 connecting the distal end portions 621a, 631a of the upper portions 621, 631 of sidewalls 620, 630 to each other. In some embodiments, clip 600 may not include front face 619 and first and second sidewalls 620, 630 may be only connected to each other by rear wall 640.

In some embodiments, the front face may extend downward from the top distal end portion of the top plate and optionally connect to at least one of the first upper portion of the first sidewall or the second upper portion of the second sidewall. In some embodiments, the front face may connect the first upper portion of the first sidewall to the second upper portion of the second sidewall without connecting to a top plate.

In embodiments wherein the first and second sidewalls are connected to each other via one of the top plate or rear wall, the clip may be generally easier to stack, store and/or ship, as well as cheaper to manufacture due to the decreased amount of materials needed by using only one wall. However, in such embodiments, the strength of the clip to securely mount a solar module to a solar power system may be less than clips which include both a top plate and rear wall.

Figure 7:
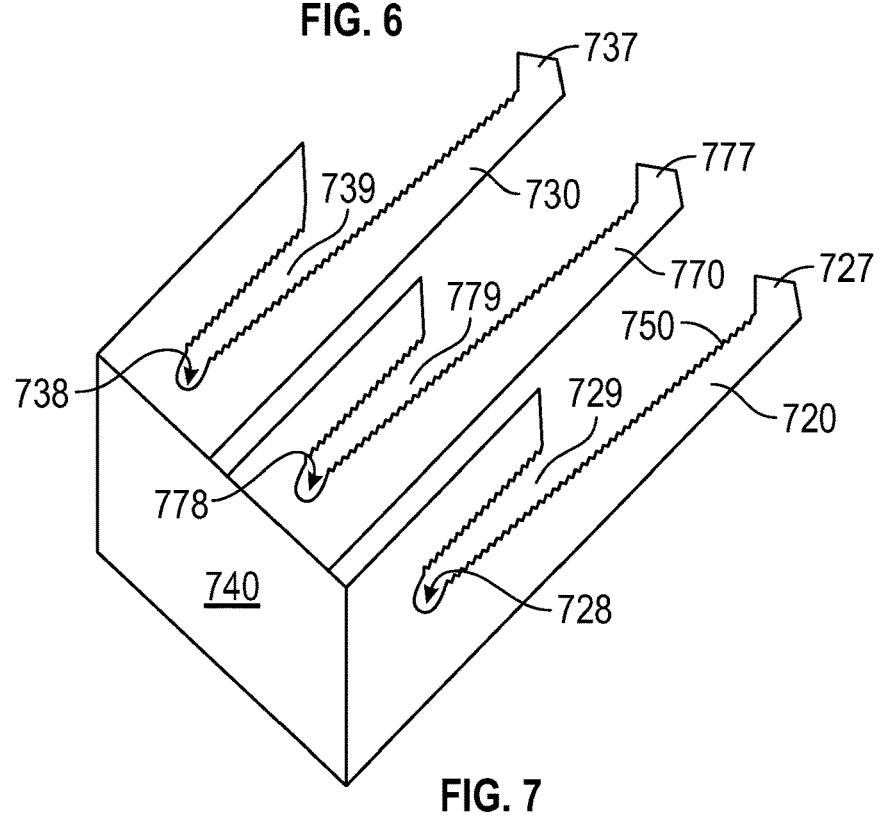
FIG. 7 is a perspective view of a clip as described in at least one embodiment herein.

Turning now to FIG. 7, clip 700 is shown to include at least a pair of sidewalls 720, 730, 770, and specifically three or more sidewalls, i.e., first sidewall 720, second sidewall 730, and third sidewall 770 positioned therebetween. Each sidewall 720, 730, and 770 being configured in any of the manners described herein with regards to sidewalls, with third sidewall 770 being positioned between, and in particularly embodiments centered between, the first and second sidewalls 720, 730. Although depicted without a top plate to provide a better view of the third sidewall 770, in some embodiments, clip 700 may also include a top plate and/or a front face wall connecting the distal end portions of the upper portions of at least two of the sidewalls 720, 730, 770 to each other.

In some embodiments, as shown, the upper and lower length of third sidewall is generally equal to the first and second upper and lower lengths of the first and second sidewalls. However, in some embodiments, the upper and lower length of the third sidewall may be less than at least one, if not both, of the first and second upper and lower lengths, respectively. In such embodiments, the shorter third sidewall may be beneficial when the rail to which the clip is being applied is round and/or not flat.

Any of the clips described herein are configured to secure a framed solar module to a mounting structure or rail of a solar power system. The solar module can include a photovoltaic laminate or panel having an assembly of crystalline or amorphous semiconductor devices or cells electrically interconnected and encapsulated within a weather-proof barrier that includes a frame. The solar modules can be mounted on and coupled to mounting structures or rails that extend from or across the support structures of the solar power system. The rails and frame may be made of any of a number of suitable materials including aluminum, steel, or stainless steel. Either or both of the rails and frame may be anodized, painted, or otherwise coated with one or more layers to protect against corrosion, wear, etc. As discussed herein, the clips include at least one serrated edge including teeth which are configured to ground the clip to the solar module by removing the layer of anodization (or paint or coating) and biting into the metal, i.e., aluminum, of the rail or frame.

Figure 8A:
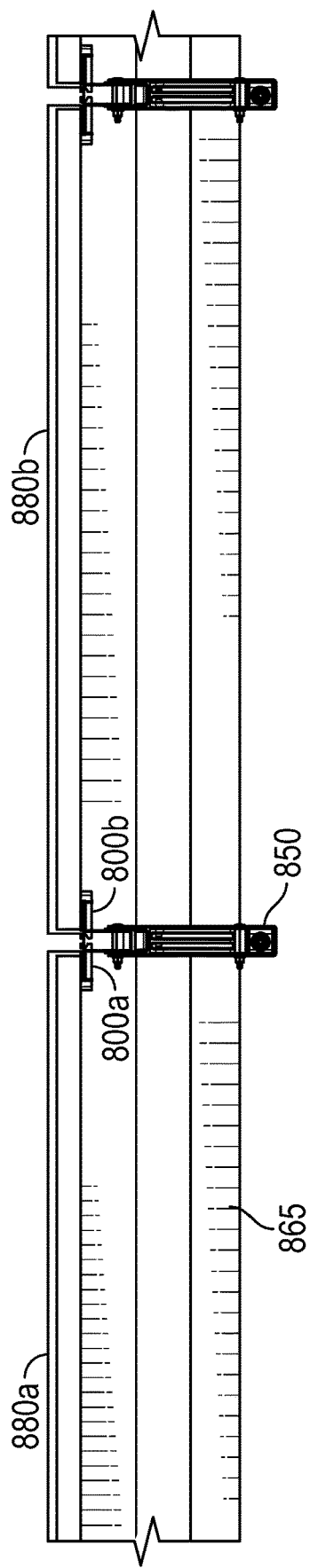
FIG. 8A is a side view of a solar power system including at least one solar module secured to a support structure via a mounting assembly and at least one clip as described in at least one embodiment herein.

As depicted in FIG. 8A, clips 800s, 800b, as described herein, are combined with a mounting assembly 850 to secure a first and second framed solar module 880a, 880b to a support structure 865, such as a torque tube, of a solar power system. The mounting assembly 850 being configured to space the first and second framed solar modules 880a, 880b from the torque tube 865. In some embodiments, the mounting assembly 850 defines a generally T-shaped cross-section.

Figure 8B:
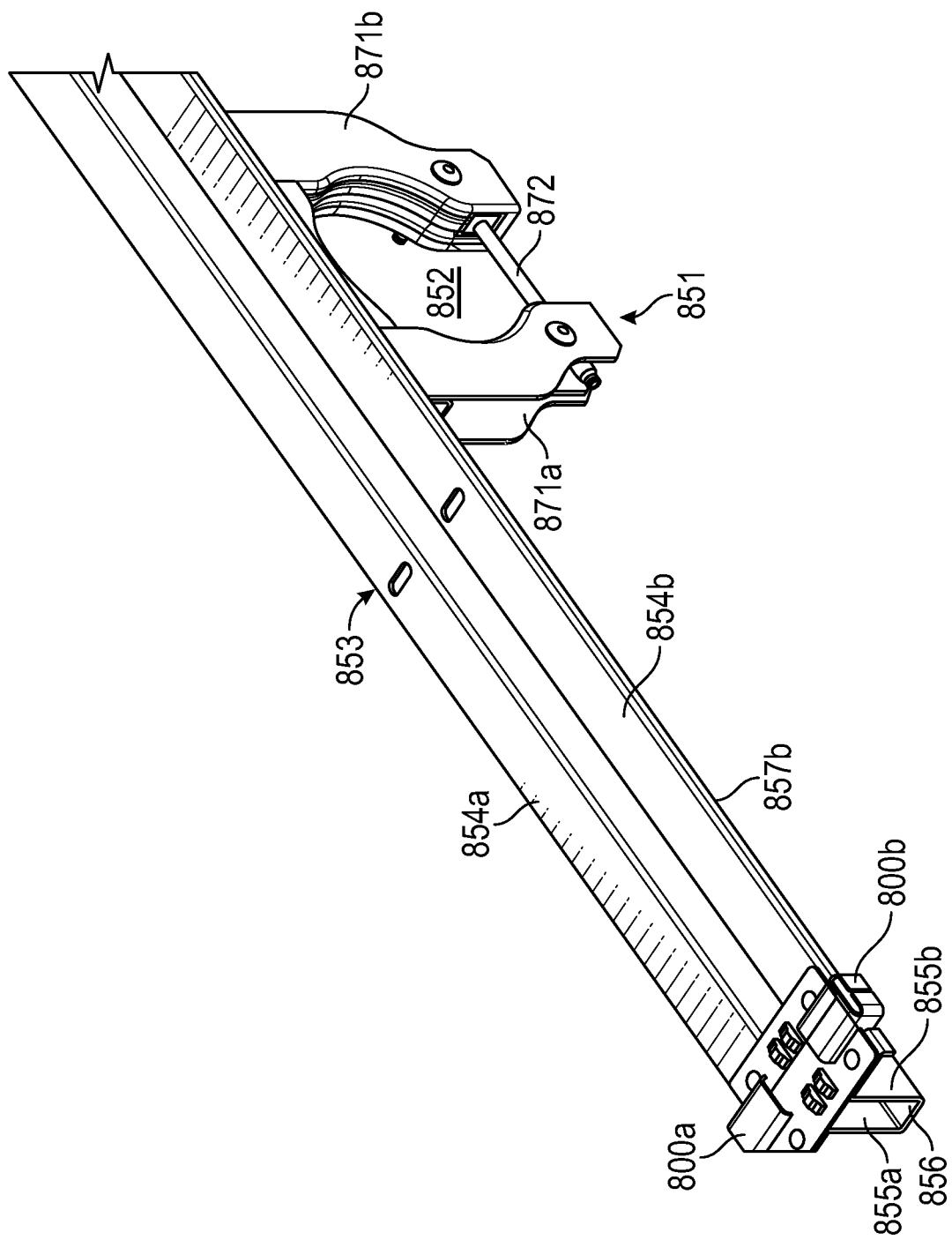
FIG. 8B is a perspective view of a mounting assembly including least one clip as described in at least one embodiment herein.
Figure 8C:
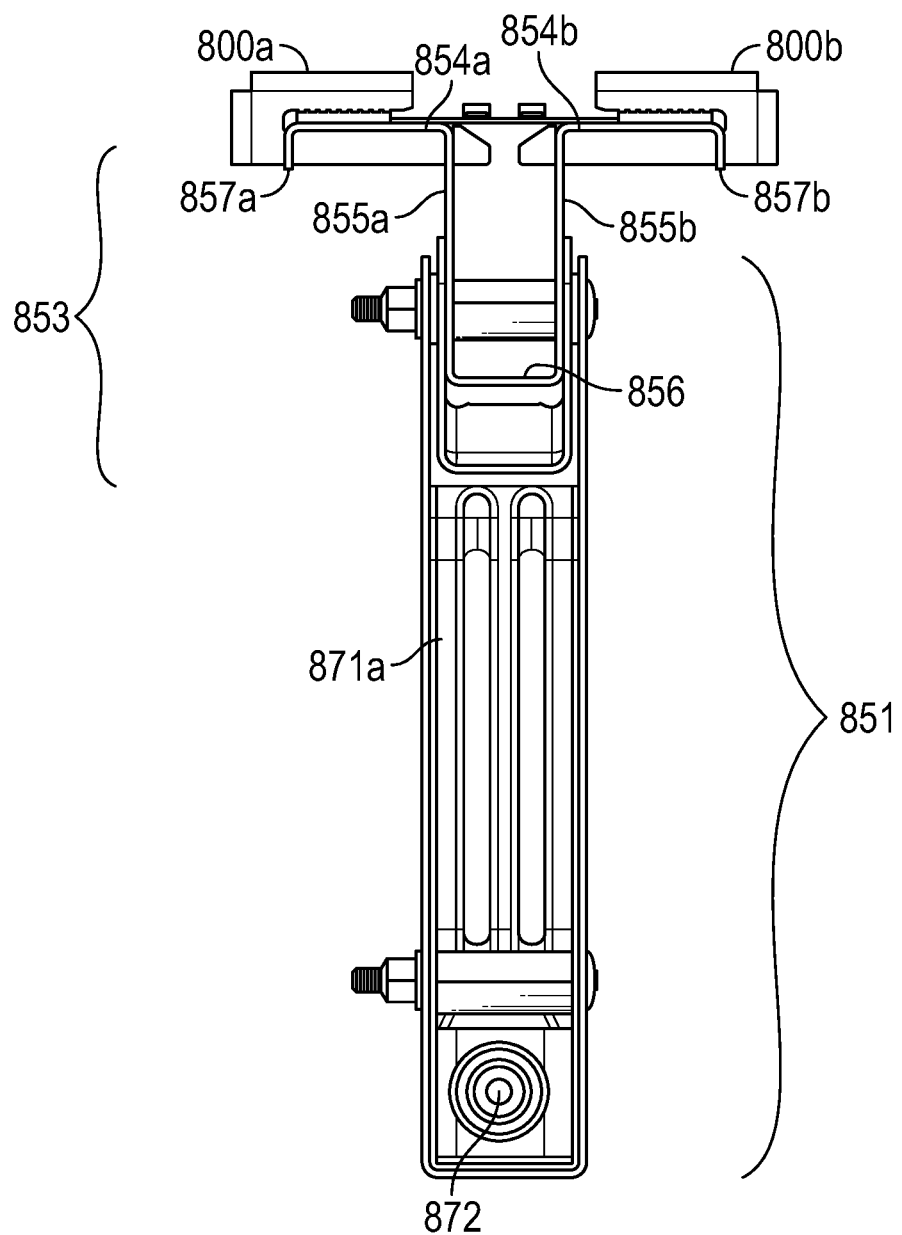
FIG. 8C is a side view of a mounting assembly including least one clip as described in at least one embodiment herein.

In FIGS. 8B-8C, the support structure or torque tube 865 and the framed solar modules 880a, 880b of FIG. 8A are removed for clarity purposes to better depict the interaction between the clips 800a, 800b and the mounting assembly 850. The mounting assembly 850 includes a mounting base 851 secured to a mounting frame 853. The mounting base 851 is configured to secure the mounting assembly 850 to the torque tube 865 and includes a mounting aperture 852 configured to receive the torque tube therethrough. As depicted, in some embodiments, both the torque tube 865 and the mounting aperture 852 is generally round or circular in shape. However, the torque tube 865 and the mounting aperture 852 can be of any suitable complimentary shape or design.

The mounting frame 853 is configured to position the framed solar modules 880a, 880b thereto. The mounting frame 853 is secured to and extends a distance from the mounting base 851 to space the framed solar modules 880a, 880b from the torque tube 865. In some embodiments, the mounting frame 853 defines a generally T-shaped cross-section.

As further shown in FIGS. 8B and 8C, the mounting frame 853 includes a first and second support rail 854a, 854b connected on an inner edge thereof to a first and second frame sidewall 855a, 855b, respectively. The first and second sidewall 855a, 855b extend away from an inner edge of the first and second support rail 854a, 854b and are connected to each other on an opposite end by a frame base 856. The first and second support rail 854a, 854b are generally coplanar and each include a first and second edge wall 857a, 857b extending from an outer edge therefrom. In some embodiments, the first and second frame sidewalls 855a, 855b are generally perpendicular to the first and second support rail 854a, 854b, as well as the frame base 856. In some embodiments, the first and second edge walls 857a, 857b are generally perpendicular to the first and second support rail 854a, 854b, as well as the frame base 856. In some embodiments, the first and second frame sidewalls 855a, 855b are generally parallel to each other, as well as the first and second edge walls 857a, 857b.

In some embodiments, the clips 800a, 800b are positioned near end portions of the first or second support rail 854a, 854b. In some embodiments, a plurality of clips 800a, 800b are positioned intermittently along a length of the first or second support rail 854a, 854b thereon. Although the clips 800a, 800b are depicted in alignment with each other in FIG. 8B, it is envisioned that in some embodiments, the clips 800a, 800b can be scattered along a length of the first or second support rail in a manner in which the clips are not aligned relative to each other.

Figure 9:
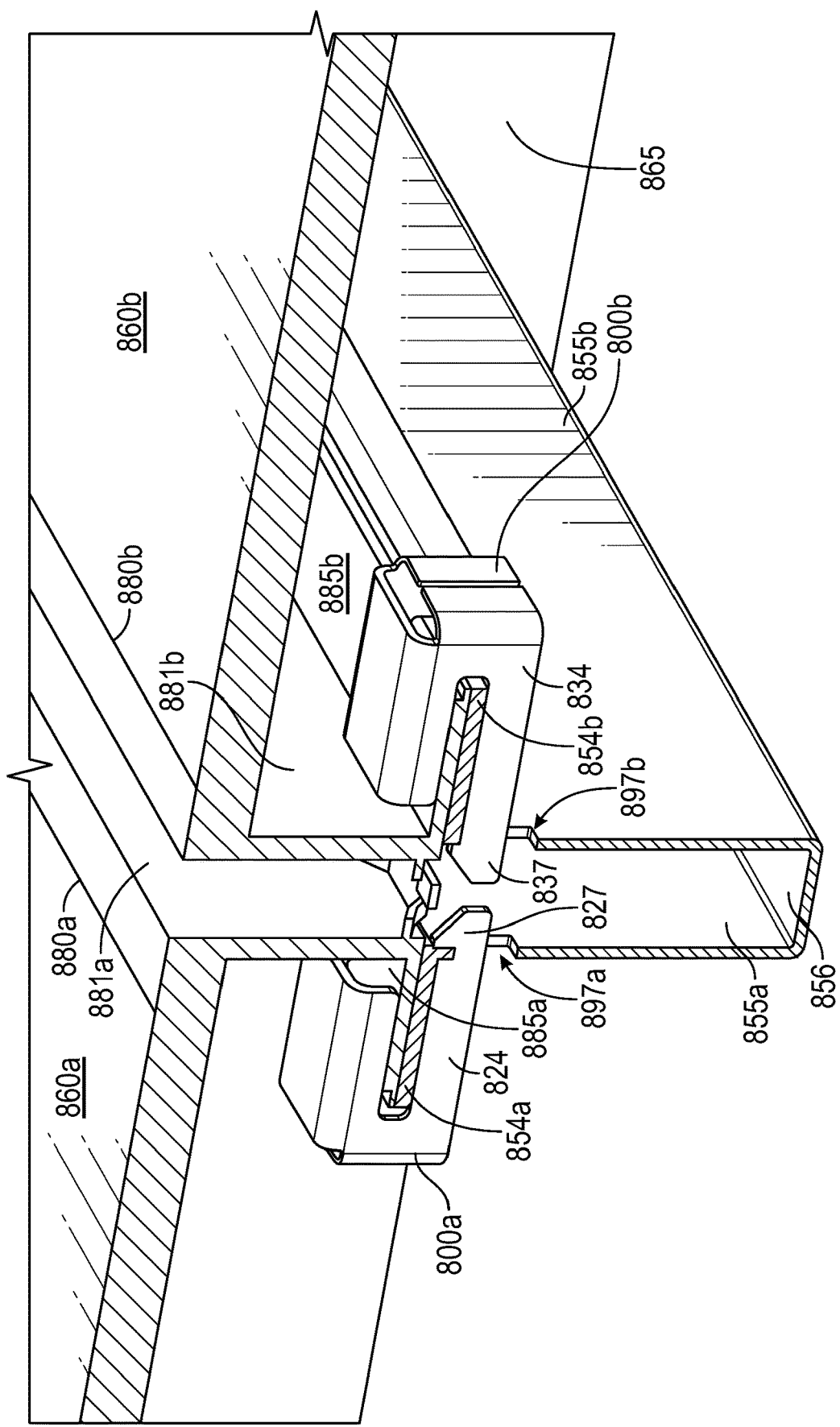
FIG. 9 is a perspective, cross-sectional view of a solar power system including at least one solar module secured to a support structure via a mounting assembly and at least one clip as described in at least one embodiment herein.

FIG. 9 depicts a cross-sectional perspective view of a first and second framed solar modules 880a, 880b positioned on a first and second support rail 854a, 854b, respectively, of a mounting frame 853. A first and second clip 800a, 800b are used to anchor the framed solar modules 880a, 880b to the mounting frame 853 thereby locking them into a fixed position relative to the first and second frame support rail 854a, 854b.

As can be seen in FIG. 9, the frame sidewalls 855a, 855b include a plurality of frame sidewall holes 897a, 897b. Each frame sidewall hole 897a, 897b is positioned below the support rail 854a, 854b between the frame base 856 and the support rail 854a, 854b. Each frame sidewall hole 897a, 897b is configured to receive and maintain at least a part of a lower portion 824, 834 of a sidewall 820, 830 of a clip 800a, 800b, as well as the entirety of the locking member 827, 837 of the clip 800a, 800b. Installation of a locking member 827, 837 into a frame sidewall hole 897a, 897b provides a wedging effect on the clip that forces the teeth or serrated edges to dig into the frame of the solar module, the support rail, or both.

In FIG. 9, the first clip 800a is shown mounting the first frame 881a of the first solar module 860a to a first support rail 854a of mounting frame 853. A first ledge 885a of the first frame 881a and the first support rail 854a are abutted up against each other and locked in a fixed position relative to each other within a slot 829 of the first clip 800a. When secured to each other, first frame ledge 885a and first support rail 854a are generally parallel to each other and in direct contact with each other.

Also in FIG. 9, a second clip 800b is shown mounting a second frame 881b of a second solar module 860b to a second support rail 854b of mounting frame 853. A second ledge 885b of the second frame 881b and the second support rail 854b are abutted up against each other and locked in a fixed position relative to each other within a slot 839 of the second clip 800b. When secured to each other, second frame ledge 885b and second support rail 854b are generally parallel to each other and in direct contact with each other.

As further illustrated in FIG. 9, the first set of teeth 855a (and any additional teeth) on the first clip 800a bite into, at least one of if not both of, the first ledge 885a or the first rail 854a beneath the first solar module 860a. Also, the second set of teeth 855b (and any additional teeth) on the second clip 800b bite into, at least one of if not both of, the second ledge 885b or the second rail 854b beneath the second module 860b. The combination of: the teeth 855a, 855b being positioned along some portion of the angled slot 829, 839; the recess 828, 838; and the locking member 827, 837 being positioned on the distal end of the extended or lengthy lower portion 824, 834, allows the clips 800a, 800b to secure and affix the solar modules 860a, 860b to the mounting frame 853 without the need of any additional fasteners, such as screws, rivets, pins, anchors, adhesives, glues, and the like. Thus, assembly of the solar power systems and/or the process of connecting the framed solar modules to the mounting assembly or support tubes of a solar tracker described herein, is made exceedingly quick and more efficient than such assembly and/or processes which require the use of an additional fastener.

In some embodiment, the clips described herein are configured to be used to secure at least one solar module to a mounting assembly without the use of a fastener. In some embodiments, the clip and/or the rail does not include preformed drilled holes configured to receive a fastener in a predetermined position when assembled. In some embodiments, the clips described herein may be combined into a kit with at least one solar module having a frame and at least one mounting assembly including a support rail. In some embodiments, the kits include a plurality of clips as described herein, a plurality of solar modules including at least one frame, and a plurality of mounting assemblies each including a support rail.

In some embodiments, the clips described herein may be used to assemble a solar power system, such as a solar tracker system. The solar tracker system may include at least one solar module mounted to a frame having a ledge, at least one mounting frame including a support rail for supporting the ledge of the framed solar module, and at least one clip described herein. The clip may include at least one structural wall selected from a top plate, a rear wall, or both, and at least a first and second sidewalls extending from opposite ends of the at least one structural wall and forming a channel therebetween, the first sidewall including a first upper portion defining a first upper length, a first lower portion defining a first lower length greater than the first upper length, and a first locking member positioned on a first lower distal end portion of the first lower portion, the first upper portion and the first lower portion separated in part by a first slot and a first recess proximal to the first slot, the first recess connecting a first upper edge of the first slot to a first lower edge of the first slot, at least one of the first upper edge, the first lower edge, or the recess is serrated, and the second sidewall including a second upper portion defining a second upper length, a second lower portion defining a second lower length greater than the first upper length, and a second locking member positioned on a second lower distal end portion of the second lower portion, the second upper portion and the second lower portion separated in part by a second slot and a second recess proximal to the second slot, the second recess connecting a second upper edge of the second slot to a second lower edge of the second slot, at least one of the second upper edge, the second lower edge, or the recess is serrated, wherein the ledge of the frame and the support rail of the mounting frame are secured within the first and second slots of the at least one clip thereby locking the at least one solar module to the mounting frame and/or support structure.

In embodiments, the solar tracker may include a plurality of framed solar modules, a plurality of mounting assemblies, and a plurality of the clips described herein. In addition, the solar trackers described herein may further include additional components commonly associated with the assembly of the solar tracker including, but not limited to, motors, junction boxes, wiring, busbars, ribbons, glass covers, torque tubes, and the like.

Methods of forming a solar tracker system are also provided. The methods include providing at least one solar module including a frame, the frame including a ledge extending from a bottom portion of the frame, positioning the ledge of the frame onto a support rail of a mounting frame, the support rail configured to matingly engage the ledge of the frame; and positioning at least one clip as described herein onto both the support rail and the ledge of the frame to lock the at least one solar module into a fixed position relative to the mounting frame.

In embodiments, the clip includes at least one structural wall selected from a top plate, a rear wall, or both, and at least a first and second sidewalls extending from opposite ends of the at least one structural wall and forming a channel therebetween, the first sidewall including a first upper portion defining a first upper length, a first lower portion defining a first lower length greater than the first upper length, and a first locking member positioned on a first lower distal end portion of the first lower portion, the first upper portion and the first lower portion separated in part by a first slot and a first recess proximal to the first slot, the first recess connecting a first upper edge of the first slot to a first lower edge of the first slot, at least one of the first upper edge, the first lower edge, or the recess is serrated, and the second sidewall including a second upper portion defining a second upper length, a second lower portion defining a second lower length greater than the first upper length, and a second locking member positioned on a second lower distal end portion of the second lower portion, the second upper portion and the second lower portion separated in part by a second slot and a second recess proximal to the second slot, the second recess connecting a second upper edge of the second slot to a second lower edge of the second slot, at least one of the second upper edge, the second lower edge, or the recess is serrated.

In some embodiments, positioning the clip onto the ledge of the frame and the rail of the mounting frame includes the serrated edges of the clip biting or cutting into at least one of the frame or rail to ground the clip to the framed solar module and/or prevent the clip from falling off or disconnecting from the frame and rail.

In some embodiments, the clips described herein may be part of kit for a solar power system. Such kits may include at least one framed solar module, at least one mounting frame including a support rail for supporting the at least one framed solar module; and at least one clip as described herein. In some embodiments, the clip includes at least one structural wall selected from a top plate, a rear wall, or both, and at least a first and second sidewalls extending from opposite ends of the at least one structural wall and forming a channel therebetween, the first sidewall including a first upper portion defining a first upper length, a first lower portion defining a first lower length greater than the first upper length, and a first locking member positioned on a first lower distal end portion of the first lower portion, the first upper portion and the first lower portion separated in part by a first slot and a first recess proximal to the first slot, the first recess connecting a first upper edge of the first slot to a first lower edge of the first slot, at least one of the first upper edge, the first lower edge, or the recess is serrated, and the second sidewall including a second upper portion defining a second upper length, a second lower portion defining a second lower length greater than the first upper length, and a second locking member positioned on a second lower distal end portion of the second lower portion, the second upper portion and the second lower portion separated in part by a second slot and a second recess proximal to the second slot, the second recess connecting a second upper edge of the second slot to a second lower edge of the second slot, at least one of the second upper edge, the second lower edge, or the recess is serrated.

In embodiments, the kit may include a plurality of framed solar modules, a plurality of mounting frames, and a plurality of the clips described herein. In addition, the kits described herein may further include additional components commonly associated with the assembly of the solar tracker including, but not limited to, motors, junction boxes, wiring, busbars, ribbons, glass covers, torque tubes, and the like.

It will be understood that various modifications may be made to the embodiments disclosed herein. Therefore, the above description should not be construed as limiting, but merely as an exemplification of preferred embodiments. Those skilled in the art will envision other modifications within the scope and spirit of the present disclosure. Such modifications and variations are intended to come within the scope of the following claims.

What is claimed is:

1. A clip suitable for mounting at least one solar module to a railing system, the clip comprising,
    a top plate including a top proximal end portion, a top distal end portion, and opposite first and second top side end portions extending therebetween,
    a first sidewall extending downwardly from the first top side end portion of the top plate, the first sidewall including a first upper portion defining a first upper length, a first lower portion defining a first lower length greater than the first upper length, and a first locking member positioned on a first lower distal end portion of the first lower portion, the first upper portion and the first lower portion separated in part by a first slot and a first recess proximal to the first slot, the first recess connecting a first upper edge of the first slot to a first lower edge of the first slot, at least one of the first upper edge, the first lower edge, or the recess is serrated, wherein the first upper edge of the first slot is generally coplanar with the top plate and the first lower edge of the first slot extends distally from the first recess at an acute angle relative to the first upper edge,
    a second sidewall extending downwardly from the second top side end portion of the top plate, the second sidewall including a second upper portion defining a second upper length, a second lower portion defining a second lower length greater than the first upper length, and a second locking member positioned on a second lower distal end portion of the second lower portion, the second upper portion and the second lower portion separated in part by a second slot and a second recess proximal to the second slot, the second recess connecting a second upper edge of the second slot to a second lower edge of the second slot, at least one of the second upper edge, the second lower edge, or the recess is serrated, and
    a rear wall connected to at least one of the top proximal end portion of the top plate, a first sidewall proximal end portion, or a second sidewall proximal end portion.

2. The clip of claim 1, wherein the top plate further includes a first top portion connected to the first sidewall, a second top portion connected to the second sidewall and a top slit separating the first top portion from the second top portion.

3. The clip of claim 1, further comprising a front face extending downward from the top distal end portion of the top plate and optionally connecting to at least one of the first upper portion of the first sidewall or the second upper portion of the second sidewall.

4. The clip of claim 1, wherein the first and second sidewalls are generally parallel to each other.

5. The clip of claim 1, wherein the first and second sidewalls are generally perpendicular to the top plate and the rear wall.

6. The clip of claim 1, wherein the first lower edge of the first slot is generally coplanar with the top plate and the first upper edge of the first slot extends distally from the first recess at an acute angle relative to the first lower edge.

7. The clip of claim 1, wherein the first recess is generally circular.

8. The clip of claim 1, wherein the first recess is serrated.

9. The clip of claim 1, wherein both the first upper edge and the first lower edge of the first slot are serrated.

10. The clip of claim 1, wherein both the second upper edge and the second lower edge of the second slot are serrated.

11. The clip of claim 1, wherein the second upper edge of the second slot is generally coplanar with the top plate and the second lower edge of the second slot extends distally from the second recess at an acute angle relative to the second upper edge.

12. The clip of claim 1, wherein the second lower edge of the second slot is generally coplanar with the top plate and the second upper edge of the second slot extends distally from the second recess at an acute angle relative to the second lower edge.

13. The clip of claim 1, wherein the clip further comprises a rear aperture positioned between the top proximal end portion of the top plate and the rear wall.

14. The clip of claim 1, wherein the rear wall further includes a first rear wall end portion connected to the first sidewall, a second rear wall end portion connected to the second sidewall and a rear slit separating the first rear wall end portion from the second rear wall end portion.

15. The clip of claim 14, wherein the clip further comprises a rear aperture positioned between the top proximal end portion of the top plate and the first and second rear wall portions.

16. The clip of claim 1, wherein the first locking member extends from the distal end portion of the first lower portion towards the first upper portion.

17. The clip of claim 1, wherein the second locking member extends from the distal end portion of the second lower portion towards the second upper portion.

18. The clip of claim 1, wherein the clip is a one-piece clip.

19. A kit for a solar power system comprising:
at least one framed solar module,
at least one mounting frame including a support rail for supporting the at least one framed solar module; and
at least one clip including at least one structural wall selected from a top plate, a rear wall, or both, and at least a first and second sidewalls extending from opposite ends of the at least one structural wall and forming a channel therebetween, the first sidewall including a first upper portion defining a first upper length, a first lower portion defining a first lower length greater than the first upper length, and a first locking member positioned on a first lower distal end portion of the first lower portion, the first upper portion and the first lower portion separated in part by a first slot and a first recess proximal to the first slot, the first recess connecting a first upper edge of the first slot to a first lower edge of the first slot, at least one of the first upper edge, the first lower edge, or the recess is serrated, wherein the first upper edge of the first slot is generally coplanar with the top plate and the first lower edge of the first slot extends distally from the first recess at an acute angle relative to the first upper edge, and the second sidewall including a second upper portion defining a second upper length, a second lower portion defining a second lower length greater than the first upper length, and a second locking member positioned on a second lower distal end portion of the second lower portion, the second upper portion and the second lower portion separated in part by a second slot and a second recess proximal to the second slot, the second recess connecting a second upper edge of the second slot to a second lower edge of the second slot, at least one of the second upper edge, the second lower edge, or the recess is serrated.

* * * * *